United States Patent
Liu et al.

(10) Patent No.: US 12,177,124 B2
(45) Date of Patent: Dec. 24, 2024

(54) USING CRDS TO CREATE EXTERNALLY ROUTABLE ADDRESSES AND ROUTE RECORDS FOR PODS

(71) Applicant: VMware LLC, Palo Alto, CA (US)

(72) Inventors: Danting Liu, Beijing (CN); Qian Sun, Beijing (CN); Jianjun Shen, Redwood City, CA (US); Wenfeng Liu, Beijing (CN); Donghai Han, Beijing (CN)

(73) Assignee: VMware LLC, Palo Alto, CA (US)

( * ) Notice: Subject to any disclaimer, the term of this patent is extended or adjusted under 35 U.S.C. 154(b) by 254 days.

(21) Appl. No.: 17/960,126

(22) Filed: Oct. 4, 2022

(65) Prior Publication Data

US 2024/0113968 A1   Apr. 4, 2024

(51) Int. Cl.
*H04L 45/745* (2022.01)
*H04L 45/02* (2022.01)
*H04L 45/586* (2022.01)

(52) U.S. Cl.
CPC ............ *H04L 45/745* (2013.01); *H04L 45/02* (2013.01); *H04L 45/586* (2013.01)

(58) Field of Classification Search
CPC ...... H04L 45/745; H04L 45/02; H04L 45/586
USPC ....................................................... 709/238
See application file for complete search history.

(56) References Cited

U.S. PATENT DOCUMENTS

| | | |
|---|---|---|
| 6,697,360 B1 | 2/2004 | Gai et al. |
| 7,869,439 B1 | 1/2011 | Ramberg et al. |
| 7,890,543 B2 | 2/2011 | Hunt et al. |
| 7,912,955 B1 | 3/2011 | Machiraju et al. |
| 8,627,442 B2 | 1/2014 | Ji et al. |
| 8,683,560 B1 | 3/2014 | Brooker et al. |
| 9,152,803 B2 | 10/2015 | Biswas et al. |
| 9,225,638 B2 | 12/2015 | Jain et al. |

(Continued)

FOREIGN PATENT DOCUMENTS

| | | |
|---|---|---|
| AU | 2004227600 B2 | 5/2009 |
| CA | 3107455 A1 | 2/2020 |

(Continued)

OTHER PUBLICATIONS

Author Unknown, "NSX and Micro-segmentation," Jan. 3, 2017, 2 pages, retrieved from https://www.youtube.com/watch?v=I_QtISXaxkE.

(Continued)

*Primary Examiner* — Anthony Mejia
(74) *Attorney, Agent, or Firm* — Quarles & Brady LLP (57) ABSTRACT

Some embodiments provide an automated method for defining externally routable Pods within a Kubernetes cluster. In some embodiments, the Pod operates in a guest cluster has its own VPC (virtual private cloud) network in a datacenter with several other guest clusters that have their own VPC networks and their own set of managers. In some embodiments, a Pod within a GC can be made externally routable so that it can be directly addressable from an external client outside of the Pod's network by using two new Kubernetes CRDs (custom resource definitions), which are an IPPool CRD and a RouteSet CRD. Examples of such external clients include VMs or Pods in another GC or a supervisor cluster connected to the particular GC through a gateway, or from a machine outside of the network of all of the GCs or SC.

20 Claims, 8 Drawing Sheets

(56) References Cited

U.S. PATENT DOCUMENTS

| | | |
|---|---|---|
| 9,258,312 B1 | 2/2016 | O'Neill et al. |
| 9,531,590 B2 | 12/2016 | Jain et al. |
| 9,536,077 B2 | 1/2017 | Bignon et al. |
| 9,590,901 B2 | 3/2017 | Tubaltsev et al. |
| 9,594,546 B1 | 3/2017 | Todd et al. |
| 9,674,275 B1 | 6/2017 | Engers et al. |
| 9,755,898 B2 | 9/2017 | Jain et al. |
| 9,774,537 B2 | 9/2017 | Jain et al. |
| 9,813,509 B1 | 11/2017 | Visser et al. |
| 9,825,810 B2 | 11/2017 | Jain et al. |
| 9,935,827 B2 | 4/2018 | Jain et al. |
| 9,979,641 B2 | 5/2018 | Jain et al. |
| 10,095,669 B1 | 10/2018 | Karppanen |
| 10,122,735 B1 | 11/2018 | Wohlgemuth |
| 10,129,077 B2 | 11/2018 | Jain et al. |
| 10,135,737 B2 | 11/2018 | Jain et al. |
| 10,193,977 B2 | 1/2019 | Ke et al. |
| 10,205,701 B1 | 2/2019 | Voss et al. |
| 10,225,137 B2 | 3/2019 | Jain et al. |
| 10,257,095 B2 | 4/2019 | Jain et al. |
| 10,270,796 B1 | 4/2019 | Veeraswamy et al. |
| 10,320,679 B2 | 6/2019 | Jain et al. |
| 10,341,233 B2 | 7/2019 | Jain et al. |
| 10,496,605 B2 | 12/2019 | Melnik et al. |
| 10,516,568 B2 | 12/2019 | Jain et al. |
| 10,547,521 B1 | 1/2020 | Roy et al. |
| 10,594,743 B2 | 3/2020 | Hong et al. |
| 10,609,091 B2 | 3/2020 | Hong et al. |
| 10,613,888 B1 | 4/2020 | Mentz et al. |
| 10,628,144 B2 | 4/2020 | Myneni et al. |
| 10,652,143 B2 | 5/2020 | Ravinoothala et al. |
| 10,693,782 B2 | 6/2020 | Jain et al. |
| 10,708,368 B1 | 7/2020 | Young et al. |
| 10,725,836 B2 | 7/2020 | Savenkov et al. |
| 10,795,909 B1 | 10/2020 | Bond et al. |
| 10,812,337 B2 | 10/2020 | Vaidya et al. |
| 10,841,226 B2 | 11/2020 | Mariappan et al. |
| 10,942,788 B2 | 3/2021 | Palavalli et al. |
| 10,944,691 B1 | 3/2021 | Raut et al. |
| 10,951,661 B1 | 3/2021 | Medan et al. |
| 10,972,341 B2 | 4/2021 | Mudigonda |
| 10,972,386 B2 | 4/2021 | Mackie et al. |
| 11,074,091 B1 | 7/2021 | Nayakbomman et al. |
| 11,086,700 B2 | 8/2021 | Myneni et al. |
| 11,159,366 B1 | 10/2021 | Gawade et al. |
| 11,190,491 B1 | 11/2021 | Kaciulis et al. |
| 11,194,483 B1 | 12/2021 | Dontu et al. |
| 11,277,309 B2 | 3/2022 | Vaidya et al. |
| 11,316,822 B1 | 4/2022 | Gawade et al. |
| 11,436,057 B2 | 9/2022 | Shen et al. |
| 11,500,688 B2 | 11/2022 | Liu et al. |
| 11,570,146 B2 | 1/2023 | Liu et al. |
| 11,606,254 B2 | 3/2023 | Liu et al. |
| 11,671,400 B2 | 6/2023 | Zhou et al. |
| 11,689,425 B2 | 6/2023 | Vaidya et al. |
| 11,689,497 B2 | 6/2023 | Shen et al. |
| 2004/0098154 A1 | 5/2004 | McCarthy |
| 2005/0129019 A1 | 6/2005 | Cheriton |
| 2007/0244962 A1 | 10/2007 | Laadan et al. |
| 2007/0245334 A1 | 10/2007 | Nieh et al. |
| 2010/0149996 A1 | 6/2010 | Sun |
| 2010/0177674 A1 | 7/2010 | Aggarwal |
| 2010/0211815 A1 | 8/2010 | Mankovskii et al. |
| 2010/0246545 A1 | 9/2010 | Berzin |
| 2010/0293378 A1 | 11/2010 | Xiao et al. |
| 2011/0161988 A1 | 6/2011 | Kashyap |
| 2011/0194494 A1 | 8/2011 | Aso et al. |
| 2011/0282936 A1 | 11/2011 | Chekhanovskiy et al. |
| 2011/0289508 A1 | 11/2011 | Fell et al. |
| 2012/0117226 A1 | 5/2012 | Tanaka et al. |
| 2012/0150912 A1 | 6/2012 | Ripberger |
| 2012/0304275 A1 | 11/2012 | Ji et al. |
| 2013/0018994 A1 | 1/2013 | Flavel et al. |
| 2013/0019314 A1 | 1/2013 | Ji et al. |
| 2013/0125230 A1 | 5/2013 | Koponen et al. |
| 2013/0174168 A1 | 7/2013 | Abuelsaad et al. |
| 2013/0266019 A1 | 10/2013 | Qu et al. |
| 2013/0283339 A1 | 10/2013 | Biswas et al. |
| 2014/0036730 A1 | 2/2014 | Nellikar et al. |
| 2014/0129690 A1 | 5/2014 | Jaisinghani et al. |
| 2014/0164897 A1 | 6/2014 | Yucel et al. |
| 2014/0223556 A1 | 8/2014 | Bignon et al. |
| 2014/0237100 A1 | 8/2014 | Cohn et al. |
| 2014/0258479 A1 | 9/2014 | Tenginakai et al. |
| 2015/0063166 A1 | 3/2015 | Sif et al. |
| 2015/0081767 A1 | 3/2015 | Evens |
| 2015/0100704 A1 | 4/2015 | Davie et al. |
| 2015/0172093 A1 | 6/2015 | Kaneko et al. |
| 2015/0222598 A1 | 8/2015 | Koponen et al. |
| 2015/0249574 A1 | 9/2015 | Zhang |
| 2015/0263899 A1 | 9/2015 | Tubaltsev et al. |
| 2015/0263946 A1 | 9/2015 | Tubaltsev et al. |
| 2015/0317169 A1 | 11/2015 | Sinha et al. |
| 2015/0348044 A1 | 12/2015 | Smith |
| 2015/0379281 A1 | 12/2015 | Feroz et al. |
| 2016/0036860 A1 | 2/2016 | Xing et al. |
| 2016/0080422 A1 | 3/2016 | Belgodere et al. |
| 2016/0094454 A1 | 3/2016 | Jain et al. |
| 2016/0094457 A1 | 3/2016 | Jain et al. |
| 2016/0094650 A1 | 3/2016 | Rio |
| 2016/0094661 A1 | 3/2016 | Jain et al. |
| 2016/0182293 A1 | 6/2016 | Benedetto et al. |
| 2016/0217301 A1 | 7/2016 | Watanabe et al. |
| 2016/0239326 A1 | 8/2016 | Kaplan et al. |
| 2016/0241436 A1 | 8/2016 | Fourie et al. |
| 2016/0254964 A1 | 9/2016 | Benc |
| 2016/0269318 A1 | 9/2016 | Su et al. |
| 2016/0294612 A1 | 10/2016 | Ravinoothala et al. |
| 2016/0315809 A1 | 10/2016 | McMurry et al. |
| 2016/0335129 A1 | 11/2016 | Behera et al. |
| 2016/0337334 A1 | 11/2016 | Murr |
| 2017/0005923 A1 | 1/2017 | Babakian |
| 2017/0005986 A1 | 1/2017 | Bansal et al. |
| 2017/0031956 A1 | 2/2017 | Burk et al. |
| 2017/0063632 A1 | 3/2017 | Goliya et al. |
| 2017/0063782 A1 | 3/2017 | Jain et al. |
| 2017/0085561 A1 | 3/2017 | Han et al. |
| 2017/0093790 A1 | 3/2017 | Banerjee et al. |
| 2017/0171144 A1 | 6/2017 | Sagiraju et al. |
| 2017/0177394 A1 | 6/2017 | Barzik et al. |
| 2017/0195210 A1 | 7/2017 | Jacob et al. |
| 2017/0206034 A1 | 7/2017 | Fetik |
| 2017/0207963 A1 | 7/2017 | Mehta et al. |
| 2017/0286698 A1 | 10/2017 | Shetty et al. |
| 2017/0317954 A1 | 11/2017 | Masurekar et al. |
| 2017/0324781 A1 | 11/2017 | Hu et al. |
| 2017/0332307 A1 | 11/2017 | Pan |
| 2017/0353351 A1 | 12/2017 | Cheng et al. |
| 2017/0366416 A1 | 12/2017 | Beecham et al. |
| 2017/0374106 A1 | 12/2017 | Hamou et al. |
| 2018/0063194 A1 | 3/2018 | Vaidya et al. |
| 2018/0083835 A1 | 3/2018 | Cole et al. |
| 2018/0089299 A1 | 3/2018 | Collins et al. |
| 2018/0114012 A1 | 4/2018 | Sood et al. |
| 2018/0123943 A1 | 5/2018 | Lee et al. |
| 2018/0131675 A1 | 5/2018 | Sengupta et al. |
| 2018/0167453 A1 | 6/2018 | Luo |
| 2018/0167458 A1 | 6/2018 | Ould-Brahim et al. |
| 2018/0167487 A1 | 6/2018 | Vyas et al. |
| 2018/0183757 A1 | 6/2018 | Gunda et al. |
| 2018/0205605 A1 | 7/2018 | Mittal et al. |
| 2018/0234459 A1 | 8/2018 | Kung et al. |
| 2018/0248827 A1 | 8/2018 | Scharber et al. |
| 2018/0262424 A1 | 9/2018 | Roeland et al. |
| 2018/0287996 A1 | 10/2018 | Tripathy et al. |
| 2018/0295036 A1 | 10/2018 | Krishnamurthy et al. |
| 2018/0331885 A1 | 11/2018 | Raymond et al. |
| 2018/0359323 A1 | 12/2018 | Madden |
| 2019/0034237 A1 | 1/2019 | Siddappa et al. |
| 2019/0036868 A1 | 1/2019 | Chandrashekhar et al. |
| 2019/0042518 A1 | 2/2019 | Marolia et al. |
| 2019/0068500 A1 | 2/2019 | Hira |
| 2019/0068544 A1 | 2/2019 | Hao et al. |
| 2019/0079751 A1 | 3/2019 | Foskett et al. |

(56) References Cited

U.S. PATENT DOCUMENTS

| | | |
|---|---|---|
| 2019/0087244 A1* | 3/2019 | Turner .................. G06F 9/5077 |
| 2019/0097879 A1 | 3/2019 | Cai et al. |
| 2019/0102280 A1 | 4/2019 | Caldato et al. |
| 2019/0103992 A1 | 4/2019 | Cidon et al. |
| 2019/0132220 A1 | 5/2019 | Boutros et al. |
| 2019/0132221 A1 | 5/2019 | Boutros et al. |
| 2019/0132283 A1 | 5/2019 | Ballard et al. |
| 2019/0140895 A1 | 5/2019 | Ennis, Jr. et al. |
| 2019/0140921 A1 | 5/2019 | Xu et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0171650 A1 | 6/2019 | Botev et al. |
| 2019/0173780 A1 | 6/2019 | Hira et al. |
| 2019/0229987 A1 | 7/2019 | Shelke et al. |
| 2019/0230126 A1 | 7/2019 | Kumar et al. |
| 2019/0238363 A1 | 8/2019 | Boutros et al. |
| 2019/0238364 A1 | 8/2019 | Boutros et al. |
| 2019/0245757 A1 | 8/2019 | Meyer et al. |
| 2019/0273683 A1 | 9/2019 | Jiang et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0356693 A1 | 11/2019 | Cahana et al. |
| 2019/0384645 A1 | 12/2019 | Palavalli et al. |
| 2019/0386877 A1 | 12/2019 | Vaidya et al. |
| 2020/0065080 A1 | 2/2020 | Myneni et al. |
| 2020/0065166 A1 | 2/2020 | Myneni et al. |
| 2020/0073692 A1 | 3/2020 | Rao et al. |
| 2020/0076684 A1 | 3/2020 | Naveen et al. |
| 2020/0076685 A1 | 3/2020 | Vaidya et al. |
| 2020/0076734 A1 | 3/2020 | Naveen et al. |
| 2020/0084112 A1 | 3/2020 | Kandaswamy et al. |
| 2020/0092275 A1 | 3/2020 | Seed et al. |
| 2020/0112504 A1 | 4/2020 | Osman |
| 2020/0213366 A1 | 7/2020 | Hong et al. |
| 2020/0250009 A1 | 8/2020 | Jaeger et al. |
| 2020/0250074 A1 | 8/2020 | Zhang et al. |
| 2020/0252376 A1 | 8/2020 | Feng et al. |
| 2020/0301801 A1 | 9/2020 | Hegde |
| 2020/0314006 A1 | 10/2020 | Mackie et al. |
| 2020/0314173 A1 | 10/2020 | Pahwa et al. |
| 2020/0344120 A1 | 10/2020 | Pianigiani et al. |
| 2020/0366558 A1 | 11/2020 | Vaidya et al. |
| 2020/0374186 A1 | 11/2020 | Scott |
| 2020/0379812 A1* | 12/2020 | Ranjan .................. G06F 9/5077 |
| 2020/0382556 A1 | 12/2020 | Woolward et al. |
| 2020/0401457 A1 | 12/2020 | Singhal et al. |
| 2020/0403853 A1 | 12/2020 | Garipally et al. |
| 2020/0403860 A1 | 12/2020 | Lewis et al. |
| 2020/0409671 A1 | 12/2020 | Mazurskiy |
| 2021/0004292 A1 | 1/2021 | Zlotnick et al. |
| 2021/0064442 A1 | 3/2021 | Alluboyina et al. |
| 2021/0099335 A1 | 4/2021 | Li |
| 2021/0165695 A1 | 6/2021 | Palavalli et al. |
| 2021/0200814 A1 | 7/2021 | Tal et al. |
| 2021/0218652 A1 | 7/2021 | Raut et al. |
| 2021/0243164 A1 | 8/2021 | Murray et al. |
| 2021/0273946 A1 | 9/2021 | Iqbal et al. |
| 2021/0306285 A1 | 9/2021 | Hirasawa et al. |
| 2021/0311803 A1 | 10/2021 | Zhou et al. |
| 2021/0314190 A1 | 10/2021 | Liu et al. |
| 2021/0314239 A1 | 10/2021 | Shen et al. |
| 2021/0314240 A1 | 10/2021 | Liu et al. |
| 2021/0314300 A1 | 10/2021 | Shen et al. |
| 2021/0314361 A1 | 10/2021 | Zhou et al. |
| 2021/0314388 A1 | 10/2021 | Zhou et al. |
| 2021/0328858 A1 | 10/2021 | Asveren et al. |
| 2021/0349765 A1 | 11/2021 | Zhou et al. |
| 2021/0365308 A1 | 11/2021 | Myneni et al. |
| 2021/0397466 A1 | 12/2021 | McKee et al. |
| 2021/0409336 A1 | 12/2021 | Talur et al. |
| 2022/0004410 A1* | 1/2022 | Chen .................. G06F 8/63 |
| 2022/0012045 A1 | 1/2022 | Rudraraju et al. |
| 2022/0035651 A1 | 2/2022 | Maurya et al. |
| 2022/0038311 A1 | 2/2022 | Shen et al. |
| 2022/0070250 A1 | 3/2022 | Baid et al. |
| 2022/0158926 A1 | 5/2022 | Wennerstrom et al. |
| 2022/0182439 A1 | 6/2022 | Zhou et al. |
| 2022/0200865 A1 | 6/2022 | Vaidya et al. |
| 2022/0278926 A1 | 9/2022 | Sharma et al. |
| 2022/0303246 A1 | 9/2022 | Miriyala et al. |
| 2022/0321495 A1 | 10/2022 | Liu et al. |
| 2022/0400053 A1 | 12/2022 | Liu et al. |
| 2023/0070224 A1 | 3/2023 | Huo et al. |
| 2023/0104568 A1 | 4/2023 | Miriyala et al. |
| 2023/0179484 A1 | 6/2023 | Liu et al. |
| 2023/0179573 A1 | 6/2023 | Sosnovich et al. |
| 2023/0231741 A1 | 7/2023 | Tang et al. |
| 2023/0231827 A1 | 7/2023 | Tang et al. |
| 2023/0244591 A1 | 8/2023 | Sun et al. |
| 2024/0080277 A1* | 3/2024 | Lee .................. H04L 47/803 |
| 2024/0236034 A1* | 7/2024 | Kim .................. H04L 65/40 |

FOREIGN PATENT DOCUMENTS

| | | |
|---|---|---|
| CN | 105897946 A | 8/2016 |
| CN | 106789367 A | 5/2017 |
| CN | 107947961 A | 4/2018 |
| CN | 108809722 A | 11/2018 |
| CN | 110531987 A | 12/2019 |
| CN | 110611588 A | 12/2019 |
| CN | 111327640 A | 6/2020 |
| CN | 111371627 A | 7/2020 |
| CN | 111865643 A | 10/2020 |
| CN | 113141386 A | 7/2021 |
| EP | 2464151 A2 | 6/2012 |
| EP | 2464152 A2 | 6/2012 |
| EP | 2830270 A1 | 1/2015 |
| EP | 3316532 A1 | 5/2018 |
| EP | 3617879 A1 | 3/2020 |
| JP | 2011070707 A | 4/2011 |
| JP | 2012099048 A | 5/2012 |
| JP | 2014535213 A | 12/2014 |
| JP | 2015115043 A | 6/2015 |
| JP | 2018523932 A | 8/2018 |
| WO | 2011159842 A2 | 12/2011 |
| WO | 2013063330 A1 | 5/2013 |
| WO | 2016160523 A1 | 10/2016 |
| WO | 2018044341 A1 | 3/2018 |
| WO | 2018044352 A1 | 3/2018 |
| WO | 2019241086 A1 | 12/2019 |
| WO | 2020041073 A1 | 2/2020 |
| WO | 2020041074 A1 | 2/2020 |
| WO | 2021196080 A1 | 10/2021 |
| WO | 2022026028 A1 | 2/2022 |
| WO | 2022204941 A9 | 10/2022 |
| WO | 2023133797 A1 | 7/2023 |

OTHER PUBLICATIONS

Author Unknown, "NSX Policy API: Getting Started Guide," Technical White Paper, Sep. 2019, 28 pages, VMware, Inc.

Author Unknown, "VMware NSX for vSphere 6.4—Application Rule Manager Enhancements," Jan. 20, 2018, 2 pages, retrieved from https://www.youtube.com/watch?v=r3IKNkt5mi8.

Author Unknown, "VMware NSX-T 2.4: Advancing NSX Everywhere for Everyone," Feb. 27, 2019, 2 pages, retrieved from https://www.youtube.com/watch?v=lqPyRBWABHg.

Non-Published Commonly Owned U.S. Appl. No. 18/211,360, filed Jun. 19, 2023, 41 pages, VMware, Inc.

Non-published Commonly Owned U.S. Appl. No. 18/227,306, filed Jul. 28, 2023, 37 pages, VMware, Inc.

Patni, Sanjay, "Pro RESTful APIs," Month Unknown 2017, 136 pages, Apress, New York City, NY, USA.

Abhashkumar, Anubhavnidhi, et al., "Supporting Diverse Dynamic Intent-based Policies Using Janus," CoNEXT 17, Dec. 12-15, 2017, 14 pages, ACM, Incheon, KR.

Abwnawar, Nasser, "A Policy-Based Management Approach to Security in Cloud Systems," Feb. 2020, 184 pages, De Monfort University, Leicester, UK.

(56) References Cited

OTHER PUBLICATIONS

Author Unknown, "Advanced Networking Features in Kubernetes and Container Bare Metal," Document 606835-001, Dec. 2018, 42 pages, Intel Corporation.

Author Unknown, "Chapter 4: Default Security Policy," IBM Security Access Manager Version 9.0, Oct. 2015, 18 pages.

Author Unknown, "Containers and Container Networking for Network Engineers: VMware NSX Container Networking," Jan. 2018, 58 pages, VMware, Inc.

Author Unknown, "E-Security Begins with Sound Security Policies," Jun. 14, 2001, 23 pages, Symantec Corporation.

Author Unknown, "Kubernetes Core Concepts for Azure Kubernetes Service (AKS)", Jun. 3, 2019, 6 pages, retrieved from https://docs.microsoft.com/en-us/azure/aks/concepts-clusters-workloads.

Author Unknown, "NSX vSphere API Guide—NSX 6.2 for vSphere," Jan. 6, 2017, 400 pages, VMware, Inc.

Author Unknown, "OpenShift Container Platform 4.6," Mar. 3, 2021, 41 pages, Red Hat, Inc.

Balla, David, et al., "Adaptive Scaling of Kubernetes Pods," NOMS 2020—2020 IEEE/IFIP Network Operations and Management Symposium, Apr. 20-24, 2020, 5 pages, IEEE, Budapest, Hungary.

Chawla, Harsh, et al., "Building Microservices Applications on Microsoft Azure: Designing, Developing, Deploying, and Monitoring," Month Unknown 2019, 271 pages, Harsh Chawla and Hemant Kathuria, India.

Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.

Non-published Commonly Owned U.S. Appl. No. 17/684,160, filed Mar. 1, 2022, 40 pages, VMware, Inc.

Non-published Commonly Owned U.S. Appl. No. 17/684,169, filed Mar. 1, 2022, 41 pages, VMware, Inc.

Non-published Commonly Owned U.S. Appl. No. 17/696,366, filed Mar. 16, 2022, 27 pages, VMware, Inc.

Non-published Commonly Owned U.S. Appl. No. 17/724,433, filed Apr. 19, 2022, 51 pages, VMware, Inc.

Non-published Commonly Owned U.S. Appl. No. 17/724,436, filed Apr. 19, 2022, 51 pages, VMware, Inc.

Non-Published Commonly Owned U.S. Appl. No. 18/102,700, filed Jan. 28, 2023, 39 pages, VMware, Inc.

Qi, Shixiong, et al., "Assessing Container Network Interface Plugins: Functionality, Performance, and Scalability," IEEE Transactions on Network and Service Management, Mar. 2021, 16 pages, vol. 198, No. 1, IEEE.

Rouse, Margaret, "What is SDDC (software-defined data center)?—Definition from WhatIs.com," Mar. 2017, 5 pages, TechTarget.com.

Sayfan, Gigi, "Mastering Kubernetes: Automating container deployment and management," May 2017, 426 pages, Packt Publishing, Birmingham, UK.

Wodicka, Brent, "A Developer's Guide to Container Orchestration, Kubernetes, & AKS," Mar. 19, 2019, 5 pages, AIS, Reston, VA, USA.

* cited by examiner

*Figure 1*

IPPool CRD

```
apiVersion: apiextensions.k8s.io/v1beta1
kind: CustomResourceDefinition                    ⟋205
metadata:
  name: ippools.vmware.com
spec:
  group: vmware.com
  versions:
    - name: v1alpha1
      served: true
      storage: true
  scope: Namespaced
  names:
    plural: ippools
    singular: ippool
    kind: IPPool
    shortNames:
    - ippool
---
apiVersion: vmware.com/v1alpha1
kind: IPPool                                      ⟋210
metadata:
  name: ippool-1
spec:
  subnets:
    - prefixLength: 24   # cidr prefix length
      ipFamily: ipv4     # IP family, ipv4 or ipv6
      name: worker-1     # Node name
    - prefixLength: 24   # cidr prefix length
      ipFamily: ipv4     # IP family, ipv4 or ipv6
      name: worker-2     # Node name
status:
  subnets:
    - cidr: 192.168.100.0/24   # NCP allocated IP pool
      name: worker-1
    - cidr: 192.168.101.0/24   # NCP allocated IP pool
      name: worker-2
  conditions:
    - type: ready  # Type of condition, 'ready' or 'failure'
      status: true # Status of the condition, one of True, False, Unknown
      reason:  ... # Brief reason
      message: ... # Human readable message indicating details
```

RouteSet CRD

```
apiVersion: apiextensions.k8s.io/v1beta1
kind: CustomResourceDefinition
metadata:
  name: routesets.vmware.com
spec:
  group: vmware.com
  versions:
    - name: v1alpha1
      served: true
      storage: true
  scope: Namespaced
  names:
    plural: routesets
    singular: routeset
    kind: RouteSet
    shortNames:
    - routeset
---
apiVersion: vmware.com/v1alpha1
kind: RouteSet
metadata:
  name: routeset1
spec:
  routes:
  - destination: <podCIDR>
    target: <nodeIPAddress>
    name: <routeName>
status:
  routes:
  - destination: <podCIDR>
    target: <nodeIPAddress>
    name: <routeName>
  conditions:
    - type: ready  # Type of condition, 'ready' or 'failure'
      status: true # Status of the condition, one of True, False, Unknown
      reason: ...  # Brief reason
      message: ... # Human readable message indicating details
```

/policy/api/v1/infra/ip-pools/<ip-pool-id>/ip-subnets/<ip-subnet-id>

PATCH https://<policy-mgr>/policy/api/v1/infra/ip-pools/IpPool-Tenant-1/ip-subnets/Subnet-1
{
  "display_name": "sc-cluster-1-gc-node1-subnet",
  "resource_type": "IpAddressPoolBlockSubnet",
  "size": "24",
  "ip_block_path":"/infra/ip-blocks/routable-block-1",
  "tags": [
    {
      "scope": "ncp/cluster",
      "tag": "sc-cluster-1"
    },
    {
      "scope": "ncp/project",
      "tag": "gc-ns-1"
    },
    {
      "scope": "ncp/vnet",
      "tag": "guest-cluster-network1"
    },
    {
      "scope": "ncp/vnet_uid",
      "tag": "2897a4c6-d51c-480e-8833-3d1a1c0a6327"
    },
    {
      "scope": "ncp/vnet_node",
      "tag": "gc-node1"
    },
  ]
}

*Figure 6*

API to Create Static Route

```
# PATCH https://<policy-mgr>/policy/api/v1/infra/tier-1s/<t1-id>/static-routes/<route-id>
{
  "network": "100.96.1.0/24",     // podCIDR
  "next_hops": [
    {
      "ip_address": "172.50.0.137",   // node IP address
    }
  ]
  "tags": [
    {
      "scope": "ncp/cluster",
      "tag": "sc-cluster-1"
    },
    {
      "scope": "ncp/project",
      "tag": "gc-ns-1"
    },
    {
      "scope": "ncp/routeset",
      "tag": "gc-node-1"
    },
    {
      "scope": "ncp/routeset_uid",
      "tag": "2897a4c6-d51c-480e-8833-3d1a1c0a6327"
    }
  ]
}
```

USING CRDS TO CREATE EXTERNALLY ROUTABLE ADDRESSES AND ROUTE RECORDS FOR PODS

BACKGROUND

With the recent increase in cloud native applications, today there is more demand than ever for fast deployment of on-demand networking for connecting machines that are deployed in software defined datacenters (SDDC). It is desirable to provide auto-deployed networking solutions as many compute-cluster administrators do not have extensive knowledge of networking. However, for administrators who wish to adjust their system's networking, it is desirable to provide such administrators with the ability to configure and customize their network deployments.

BRIEF SUMMARY

Some embodiments provide an automated method for defining externally routable Pods within a Kubernetes cluster. Externally routable Pods are Pods that are directly addressable from an external client outside of the Pod's network. In some embodiments, the Pod (1) resides in a guest cluster that is managed by its own set of one or more managers, and (2) connects to the external network through one or more intervening gateway routers that are configured by a set of one or more controllers of a supervisor cluster. In some embodiments, the Pod's guest cluster has its own VPC (virtual private cloud) network in a datacenter with several other guest clusters that have their own VPC networks and their own set of managers.

In some embodiments, a Pod within a GC can be made externally routable so that it can be directly addressable from an external client outside of the Pod's network by using two new Kubernetes CRDs (custom resource definitions), which are an IPPool CRD and a RouteSet CRD. Examples of such external clients include VMs or Pods in another GC or a supervisor cluster connected to the particular GC through a gateway, or from a machine outside of the network of all of the GCs or SC.

At a control plane of a supervisor second cluster (SC), the method of some embodiments (1) receives, from a server, notification that an IPPool custom resource instance has been created in response to an addition of the worker node to the first cluster, (2) creates a set of one or more externally routable IP subnets for the IPPool, and (3) provides, to the server, the set of externally routable IP subnets for the server to use to update IPPool customer resource instance. The method then provides a status update to a manager in the Pod's GC, which this manager then uses to direct a Kubernetes manager to update a CIDR (Classless Inter-Domain Routing) of the Pod on the worker node.

Before the SC control plane receives the notification, the Kubernetes manager in some embodiments sends to the manager of the Pod's GC a notification that the worker node has been added, so that this manager can then send an order to the server to create an IPPool custom resource based on an IPPool CRD. The server also receives from the manager of the Pod's GC, a request to create a RouteSet custom resource based on the RouteSet CRD. This manager then creates the RouteSet CR and sends the SC control plane a notification that a RouteSet CR has been added.

The SC control plane, in turn, creates in response one or more static routes to deploy at one or more intervening gateway routers between the Pod in the first cluster of the VPC and a network external to a first network for the first VPC. As mentioned above, the external network can be the SC network, the network of another GC, or a network residing outside of the datacenter on the other side of its gateways.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
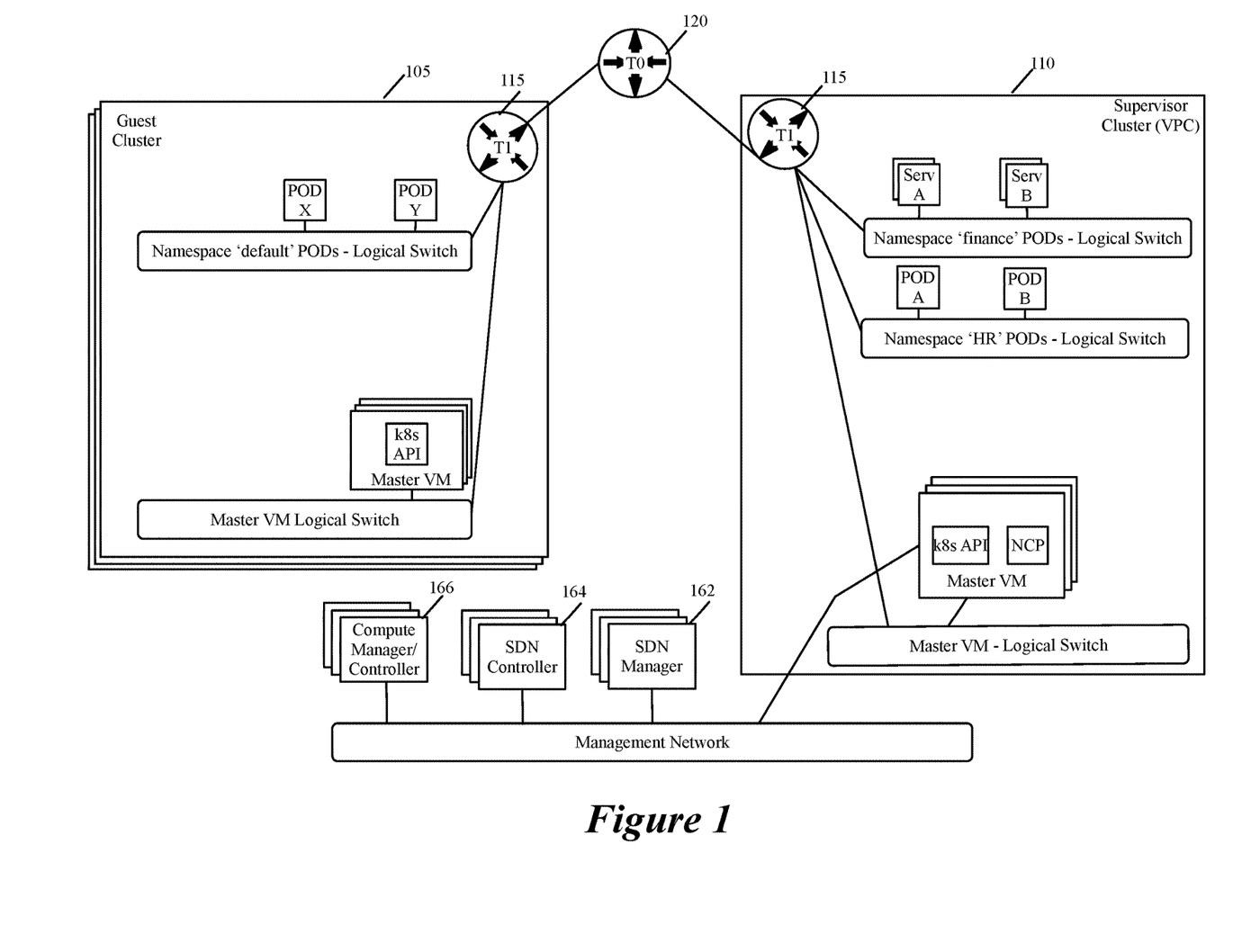
FIG. 1 conceptually illustrates an example of externally routable Pods that are defined in a guest cluster.

Some embodiments provide an automated method for defining externally routable Pods within a Kubernetes cluster. Externally routable Pods are Pods that are directly addressable from an external client outside of the Pod's network. FIG. 1 illustrates an example of externally routable Pods that are defined in a guest cluster. This figure illustrates several guest clusters 105, a supervisor cluster 110 and two tiers (T0 and T1) of gateway routers 115 and 120 that connect these clusters. In this example, each GC has its own tier 1 (T1) router, the SC has its own T1 router and all the T1 routers connect to one T0 router.

In other embodiments, other gateway router architectures are used. For instance, in some embodiments, one tier 1 (T1) gateway router connects the different guest clusters (GCs) and supervisor cluster (SC). In still other embodiments, the supervisor cluster has one tier 1 router for each of its namespaces and each guest cluster connects to the SC T1 router for the namespace under with the guest cluster operates.

In some embodiments, each guest or supervisor cluster has its own compute and network managers/controllers. In addition, the supervisor cluster has managers and controllers for configuring the gateways between the GCs and between the GCs/SC and external networks on the other side of the Tier 0 gateway router 120. In some embodiments, the SC 110 also has responsibility of assigning for a worker node in a GC a set of IP addresses (e.g., an IP CIDR) that allows Pods on this worker node to be externally routable from machines outside of the GC's network (e.g., from machines outside of the GC's virtual private cloud, VPC).

In some embodiments, a Pod within a GC can be made externally routable so that it can be directly addressable from an external client outside of the Pod's network by using two new Kubernetes CRDs, which are an IPPool CRD and a RouteSet CRD. Examples of such external clients include VMs or Pods in another GC or a supervisor cluster connected to the particular GC through a gateway, or from a machine outside of the network of all of the GCs or SC.

In some embodiments, the scope that supports routable Pod CIDRs for a guest cluster includes (1) inside the supervisor cluster (T0 router domain), such that the Pod traffic is routable within the SC T0 domain, and can be routed across SC Namespaces, and (2) global scope across SC, such that the Pod traffic can be routed to an external network outside of the SC T0.

To allow a GC Pod be routable from outside of the GC network, the SC controllers as well as the SC-adapter controllers have to be configured as follows. To allow traffic to be sent to and received from the externally routable Pod, the SC controller sets one or more static routes for the Pod network are added in some embodiments on one or more intervening gateways (e.g., Tier-1 router that is connected with GC node's segment). Some embodiments define service rules that are enforced at the gateways with the static routes (e.g., SC T1 router) on the packets that are sent to or received from the externally routable Pod.

Also, for different routable scope, static route advertisement on Tier-1 router and Tier-0 router are different in some embodiments. For instance, inside Supervisor Cluster T0 domain, some embodiments enable static route advertisement on T1 router and enable route re-distribution (Tier-1 static routes) on T0 router, but do not advertise static route to T0 BGP neighbors. For the global scope (outside of T0 domain), some embodiments enable static route advertisement on T1 and enable route re-distribution (Tier-1 static routes) on T0 router, and advertise static route to T0 BGP neighbors.

In some embodiments, the GC control plane does not talk directly with the SC control plane. Instead, in these embodiments, a network container plugin (referred to as NCP) on the SC receives information and communicates with the SC control plane to initiate the configuration changes to the SC control plane. One example of NCP is used in VMware's vSphere system. In this system, NCP is a control plane module that run as a Kubernetes pod in the Supervisor cluster control plane. NCP watches for network resources added through the Kubernetes API and orchestrates the creation of corresponding objects in NSX environment of vSphere.

The overall workflow for using the IPPool and RouteSet CRDs is as follows. In some embodiments, the SC has a Network Profile that includes a Namespace level routable CIDR configuration, which could be used to assign IP addresses to a GC Pod. In some embodiments, there is a NamespaceNetwork CR (custom resource, which is an instance of CRD) created based on the Network Profile configurations. The NCP will allocate subnets from NamespaceCIDR in NamespaceNetwork CR.

During the Guest Cluster creation, some embodiments add routing properties in a KubernetesCluster CRD to configure routable Pods. Also, to add externally routable Pod to a GC, some embodiments use the two new CRDs, RouteSet CRD and IPPool CRD, to assign one or more IP subnets to the worker node and to define statistic routes for the Pod. In some embodiments, the GCCP service creates the IPPool CRD to request the GC Node's Pod CIDR. The NCP will then allocate one or more subnets from the SC Namespace CIDR.

The RouteSet CRD is then used to configure static routes on the SC Namespace network for the GC Pod CIDRs. The GC cloud provider (GCCP) service in some embodiments creates a RouteSet CR for each GC Node in the Supervisor Namespace, with the node.PodCIDR. The NCP will create a static route on the SC Namespace T1. The GCCP service is a Kubernetes control plane service that interacts with cloud provider layer (e.g., Amazon Web Services, Google Cloud, vSphere, etc.) to configure cloud services (e.g., load balancer, route table, routable IP allocation, storage volume, etc.) for a Kubernetes cluster. When the SC is operated by vSphere, the cloud provider layer is the SC API server. The SC API server in some embodiments is the WCP supervisor Kubernetes API server.

In some embodiments, the GCCP service will create a single IPPool CR for each guest cluster. After the NCP allocates subnets from the SC Namespace IPPool, the GCCP service will set it to Node.podCIDR. The GCCP service will set the Node name and subnet prefix and IP family in IPPool CR, while the NCP will update the CIDR to IPPool CR. For GC Node scale up/down in runtime, the GCCP service will create/delete IPPool CR accordingly, and then update the Node.podCIDR.

Figure 2:
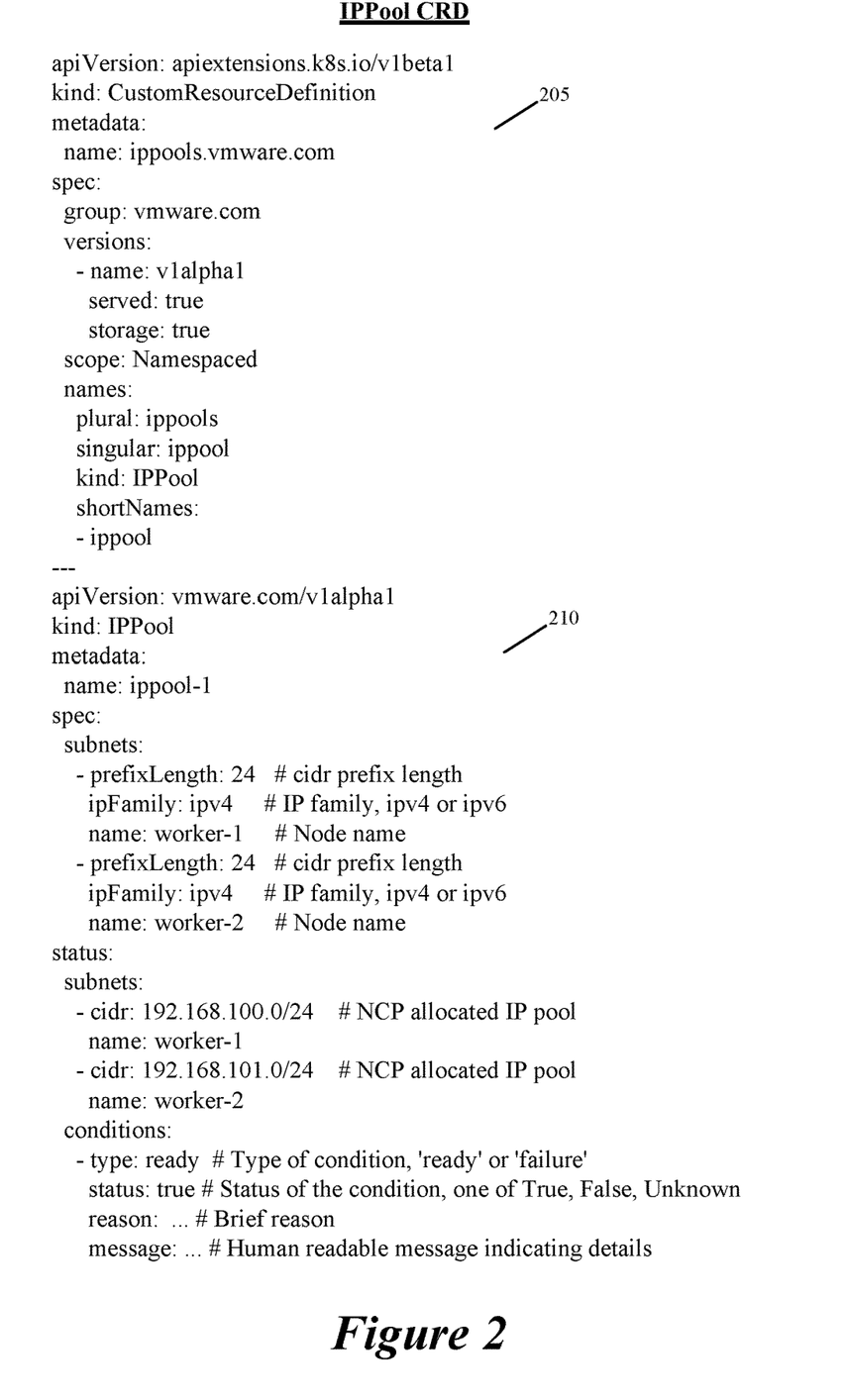
FIG. 2 conceptually illustrates an example of an IPPool CRD and CR that is specified in some embodiments.

FIG. 2 illustrates an example of an IPPool CRD 200 and CR 205 that is specified in some embodiments. As shown, the CRD has a scope and name fields, identifying the namespace scope and several names associated with the CRD. The CR 205 has a metadata attribute containing its name, plus spec and status attributes. As shown, the subnet attributes in this example specify two subnets each with a 24 value prefix length and IPv4 type in this instance. The status attribute specifies two subnets, 192.168.100.0/24 and 192.168.101.0/24, as well as several condition values.

Figure 3:
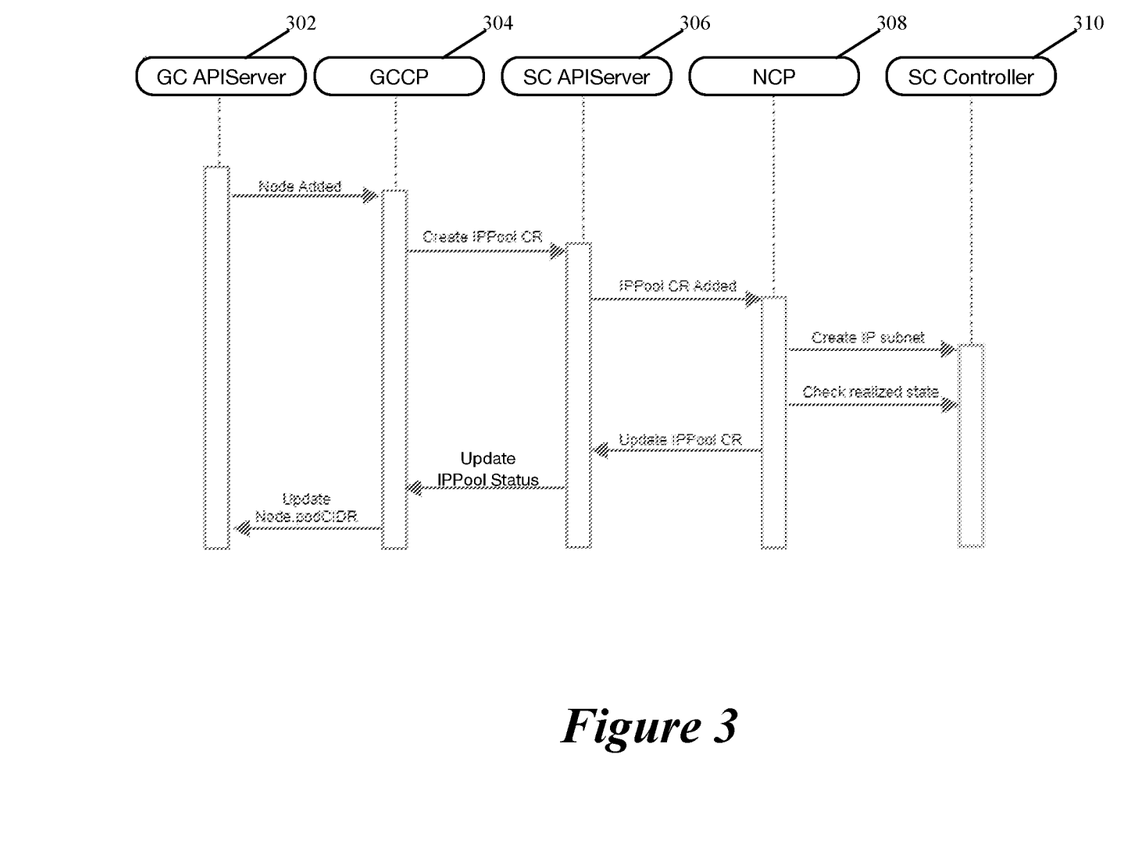
FIG. 3 conceptually illustrates a data flow diagram that illustrates how an IP pool of externally routable IP addresses is created for a worker node.

FIG. 3 presents a data flow diagram that illustrates how an IP pool of externally routable IP addresses is created for a worker node, so that IP addresses from this pool can be assigned to Pods operating on the worker node. As shown, the process starts when a GCCP service 304 receives notification from a GC API server 302 (e.g., a Kubernetes API server) that a worker node has been added to a guest cluster.

The GCCP service 304 then directs the SC API server 306 to create an IPPool custom resource. The SC API server 306 creates this resource from the IPPool CRD, and then notifies the NCP 308 that the IPPool CR has been added. The NCP then directs the SC controller 310 (e.g., an NSX-T controller cluster) to create one or more IP subnets that are specified in the created CR's specification. The NCP 308 then collects the realized state for the created IP subnet(s) from the SC controller 310. In some embodiments, the realized state includes the status values, such as the status values shown in FIG. 2, which include the created subnet values as well as the condition attributes.

The NCP 308 then provides the collected realized state information to the SC API Server 306, which then passes the creation of the IPPool CR and its state to the GCCP service 304. This manager then uses the received information to update its records, and to also direct the GC API Server 302 to update the Node.podCIDR. In this manner, the GCCP service 304 in some embodiments creates a single IPPool CR for each guest cluster, and after the NCP 308 allocates subnets from the SC Namespace IPPool for this CR, the GCCP service will set it to Node.podCIDR. The GCCP service also sets the Node name and subnet prefix and IP family in IPPool CR, while the NCP defines CIDR for IPPool CR.

When the Pod is created on a worker node and this Pod needs to have an externally routable IP address, an IP address is assigned to this Pod from the externally-routable IP pool that was created for this Pod through the IPPool CRD. To enable packets to reach this Pod from an external network (e.g., from a SC machine, another GC machine or a machine on the other side of the T0 router in FIG. 1), one or more static routes need to be defined for this Pod in the intervening routers.

Figure 4:
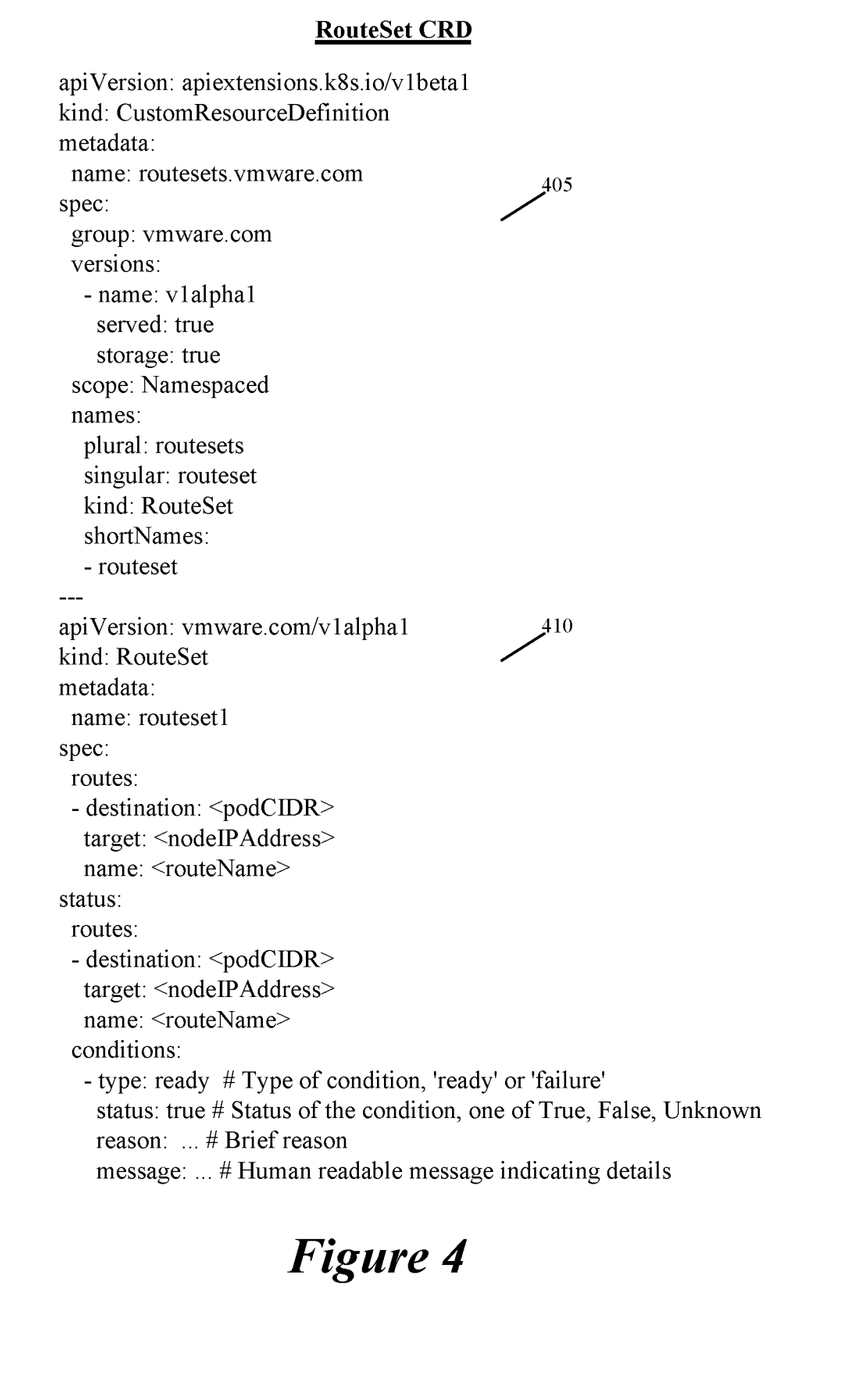
FIG. 4 conceptually illustrates an example of a routeset1 CR that is defined based on this CRD.

To define such static routes, some embodiments use the RouteSet CRD 405 that is illustrated in FIG. 4. This figure also illustrates an example of a routeset1 CR 410 that is defined based on this CRD. As shown, the CRD 405 includes kind, metadata and spec attributes. The spec attribute includes group, version, scope and name attributes. The routeset1 CR 410 includes kind, metadata, spec and status attributes. The spec attribute specifies that each route has a destination that is the podCIDR, a target that is the IP addresses of the pod's worker node (i.e., nodeIPAddress) and a route name. The status attribute then provides the values for the destination, target and name attributes (e.g., as specified by the SC controller). The destination and target IP parameters are specified because when a Pod is created on a worker node, for a packet to reach the Pod, the packet first needs to be routed the worker node and then the Pod.

Figure 5:
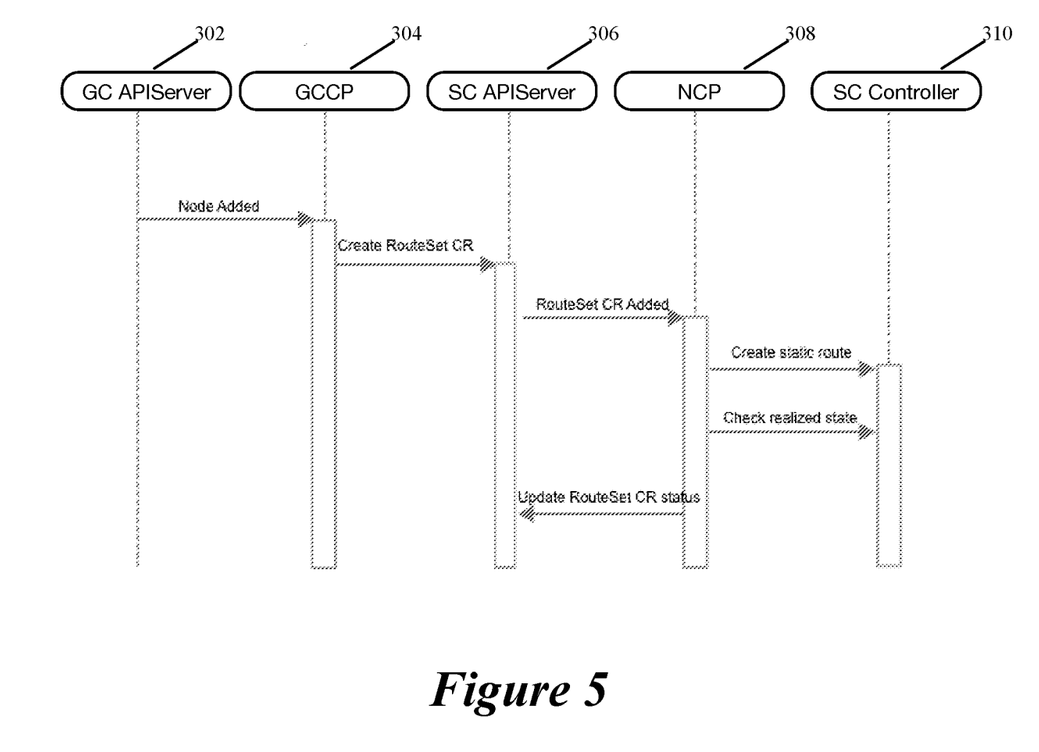
FIG. 5 conceptually illustrates a data flow diagram for creating a RouteSet CR for a worker node or a Pod that is instantiated.

FIG. 5 presents a data flow diagram for creating a RouteSet CR for a worker node or a Pod that is instantiated. As shown, the process starts when the GCCP service 304 receives notification from the GC API Server 302 that a worker node with a routable Pod has been added to a GC managed by the GCCP service 304. In some embodiments, this process also starts when the GCCP service receives notification that a new routable Pod has been added to a previously deployed worker node.

The GCCP service 304 then directs the SC API Server 306 to create a RouteSet CR. The API server 306 creates this CR, and also informs the NCP 308 of the creation of this CR. The NCP 308 then directs the SC controller 310 to create for the RouteSet CR instance one or more static routes, such as one or more static routes for the intervening T0 or T1 routers between the externally routable Pod's GC and the external machines that needs to reach the Pod (e.g., the machines in the other GCs, SC, or the machines in the external networks on the other side of the T0 router). The SC controller 310 in some embodiments also defines middlebox service rules and distributes these service rules to the gateways with the static routes (e.g., SC T1 router) and/or to middlebox service nodes (e.g., service VMs, service engines or service appliances) associated with these gateways, so that these gateways and/or service nodes can enforce these middlebox service rules on the packets that are sent to or received from the externally routable Pod.

The NCP 308 retrieves the status information for the RouteSet CR from the SC controller 310, and then provides this information to the SC API server 306, which then updates its created RouteSet CR status attributes to reflect this state information. Based on the route data that the SC controller receives from the NCP and provides to the NCP, the SC controller then creates one or more static routes in the intervening T0 and T1 routers between the externally routable Pod's GC and the external machines that needs to reach the Pod.

In some embodiments, the IPPool CR and RouteSet CR can be created only if routable-pod is enabled for the GC (e.g., for a GuestCluster CRD). As each GC has an SC ServiceAccount, the GCCP service in some embodiments creates a Role with permission to get/list/watch/create/delete/update the IPPool CRD and RouteSet CRD, and then bind the ServiceAccount with the Role. The GCCP service then authenticates to list/create/delete the IPPool CR and RouteSet CR in SC by using this ServiceAccount.

In some embodiments, the routes interface of a route controller in an upstream Kubernetes CP manager has the following structure

```
// Route is a representation of an advanced routing rule.
type Route struct {
    // Name is the name of the routing rule in the cloud-provider.
    Name string
    // TargetNode is the NodeName of the target instance.
    TargetNode types.NodeName
    // DestinationCIDR is the CIDR format IP range that this routing rule
    // applies to.
    DestinationCIDR string
    // Blackhole is set to true if this is a blackhole route
    // The node controller will delete the route if it is in the managed range.
    Blackhole bool
}
// Routes is an abstract, pluggable interface for advanced routing rules.
type Routes interface {
    // ListRoutes lists all managed routes that belong to the specified clusterName
    ListRoutes(ctx context.Context, clusterName string) ([ ]*Route, error)
    // CreateRoute creates the described managed route
```

```
    // route.Name will be ignored, although the cloud-provider may use nameHint
    // to create a more user-meaningful name.
      CreateRoute(ctx context.Context, clusterName string, nameHint string, route
*Route) error
    // DeleteRoute deletes the specified managed route
    // Route should be as returned by ListRoutes
      DeleteRoute(ctx context.Context, clusterName string, route *Route) error
}
```

In some embodiments, the GCCP service gets RouteSet CR list from SC namespace, filters RouteSet CR that belong to this cluster, and only sends a return to route controller if CRD status "ready" is true. Also, the RouteSet CRD definition in some embodiments is added in GCCP service, so the GCCP service can create the RouteSet CR through API client interfaces. For NotReady RouteSet CR, the GCCP service in some embodiments would not re-create them but wait for the NCP to realize. In some embodiments, the GCCP service in some embodiments will request deletion of the RouteSet CR when there is a Node deleted, while the NC will request deletion of static routes for a GC when the GC is deleted.

The table below provides the mapping between RouteSet CR and Route struct in route controller in some embodiments.

| Route struct | RouteSet CR | Notes |
| --- | --- | --- |
| name | metadata.name | nameHint is node UID. We could set <nameHint>_<podCIDR> as the CR name |
| TargetNode | name target | TargetNode is name of route node IP address IP family of node address and podCIDR should be the same. There are 3 types of address: Hostname, ExternalIP or InternalIP, will choose node InternalIP address first, then ExternalIP address. |
| DestinationCIDR | destination | node.spec.podCIDR (single stack) or node.spec.podCIDRs (dual stack) RouteSet CR is per Kubernetes cluster Node |

Figure 6:
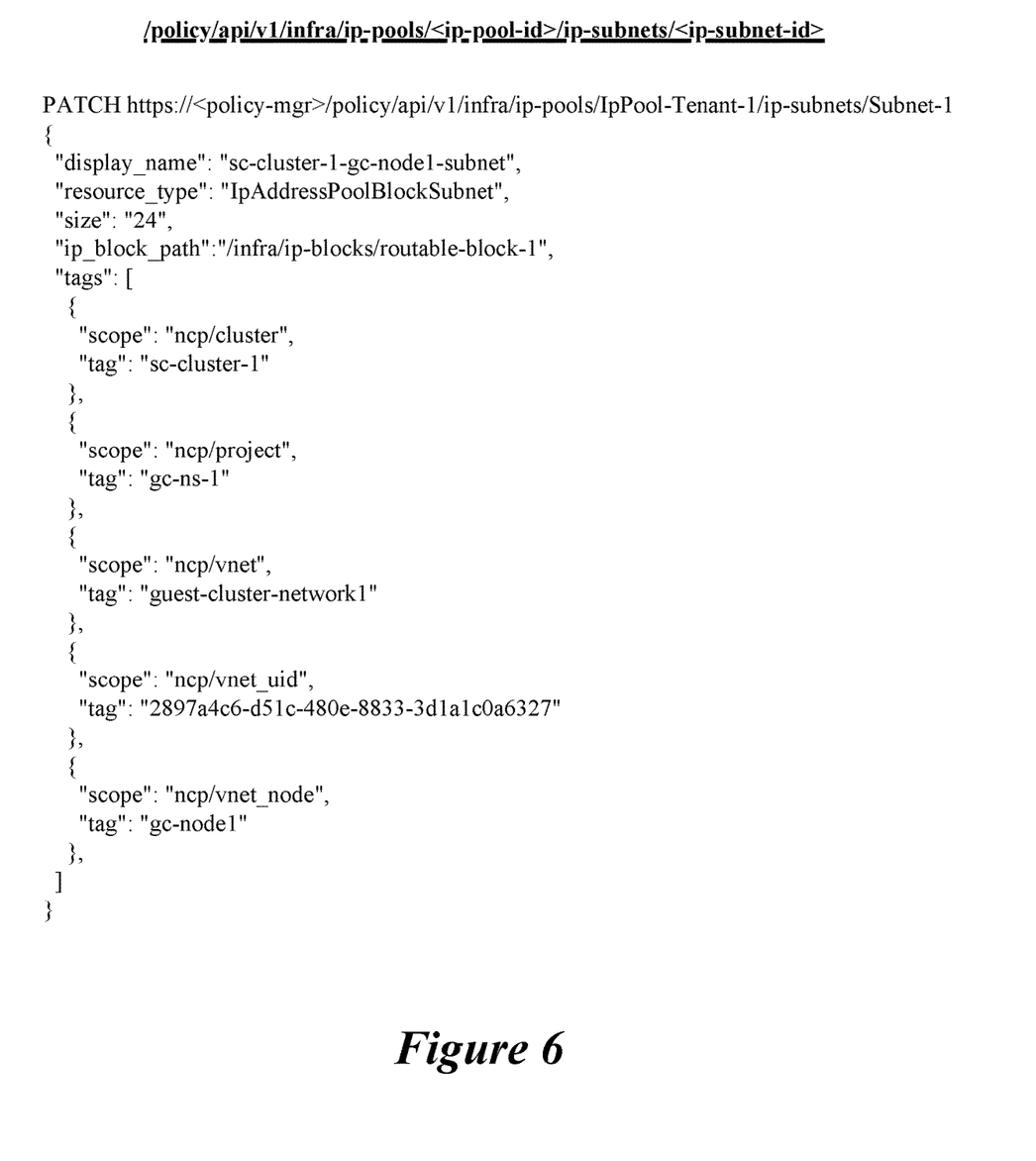
FIG. 6 conceptually illustrates an example of an IPPool API.

In some embodiments, NCP 308 creates IP blocks based on a NamespaceNetwork CR. After the NCP gets an IPPool CR event, the NCP creates the IP pool from the IP blocks. When the NamespaceNetwork CIDR does not exist, the NCP will create the IP pool from the SC Pod CIDR. FIG. 6 presents an example of an IP Pool API.

In some embodiments, the NCP 308 watches RouteSet CR events, and creates static routes on GC's T1 router. The GCCP service 304 in some embodiments creates RouteSet CR with a label. The NCP will check if route destination belongs to the SC namespace subnetCIDR or cluster container IP block. To manage static routes, the NCP 308 creates a RouteSet CR watcher, creates a RouteSet CR controller to process events, and creates RouteSet CR store and SC static route store.

Figure 7:
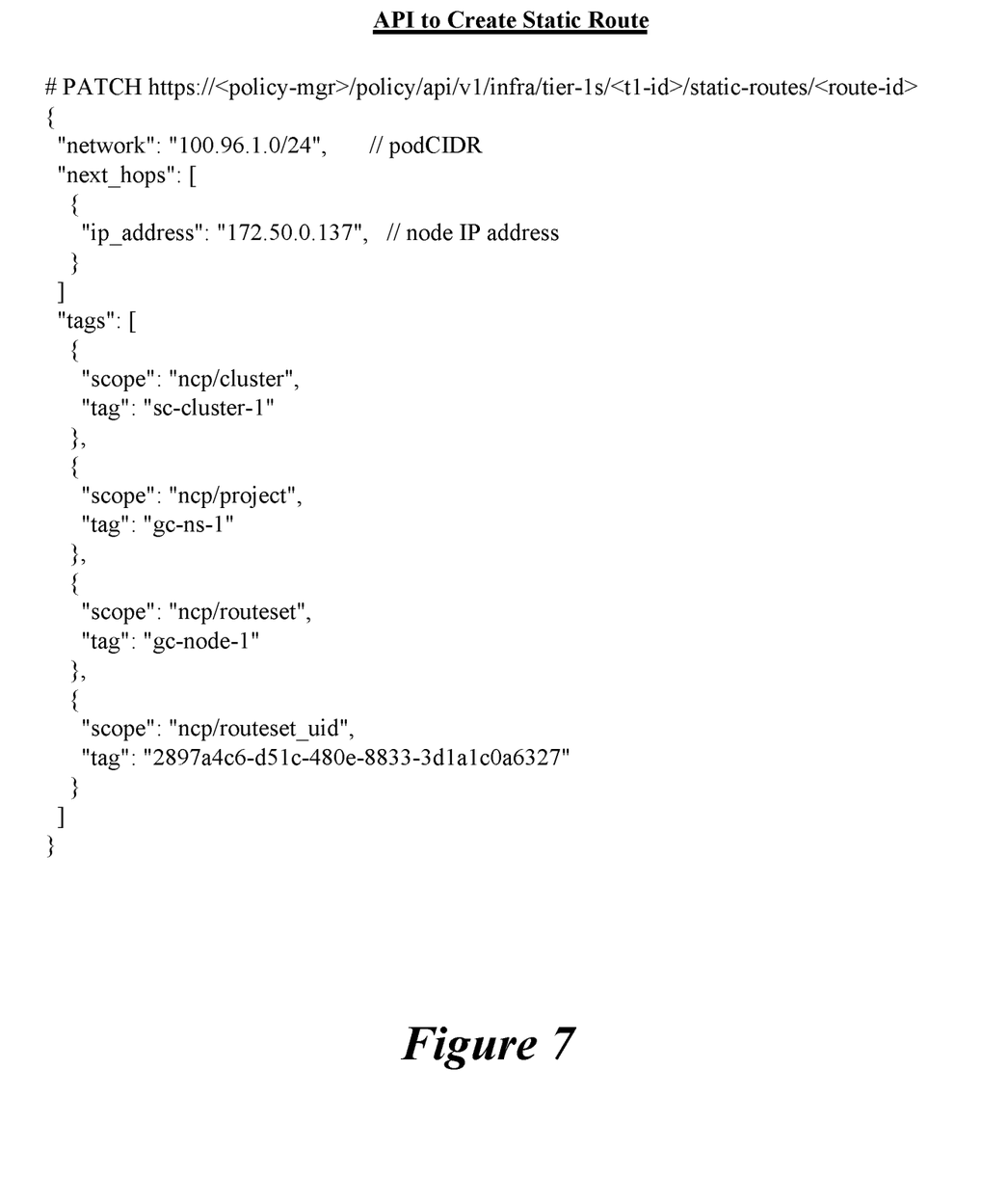
FIG. 7 conceptually illustrates an example of an API to create a static route on a T1 router.

Listed below are examples of APIs used in some embodiments to create, check, delete, and list static routes, while FIG. 7 illustrates an example of an API to create a static route on a T1 router.

```
    // Create static route
    PATCH /policy/api/v1/infra/tier-1s/<tier-1-id>/static-routes/<route-id>
    // Check static route realization status
    GET   /policy/api/v1/infra/realized-state/realized-entities\?intent_path\=/infra/tier-
1s/<tier-1-id>/static-routes
    /<route-id>
    // Delete static route
    DELETE /policy/api/v1/infra/tier-1s/<tier-1-id>/static-routes/<route-id>
    // List static routes by searching vnet-uid tag
    GET
/policy/api/v1/search/query\?query\=resource_type:StaticRoutes+AND+tags.scope:ncp/vnet_uid
+AND+tags.tag:
    <vnet_uid>
```

The above-described approach of using CRDs to deploy externally routable Pods has several advantages. It allows cloud providers and network administrators a very simple way of deploying and supporting Pods with externally routable IP Addresses. Such Pods can be directly addressed from a client external to the Guest Cluster. Also, the Pod IPs are preserved for traffic to external network, so external network services and servers can identify the source Pods and apply policies based on the Pod IPs. When Pods reach out to shared services, the source IP address is going to be the Pod IP address instead of the Nat'ed IP address.

Moreover, the GC data plane will not require encapsulation and the overhead associated with encapsulation protocols for routing to and from these Pods from and to the external networks. The Pod traffic will also be transparent to the SC fabric enabling the potential to deploy advanced SC services on the traffic. This approach also allows administrators to audit and trace egress requests from the Pods to common shared services. In addition to audit and traceability, there are deployment that have legacy applications that do not support connections over network addressed translated addresses.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
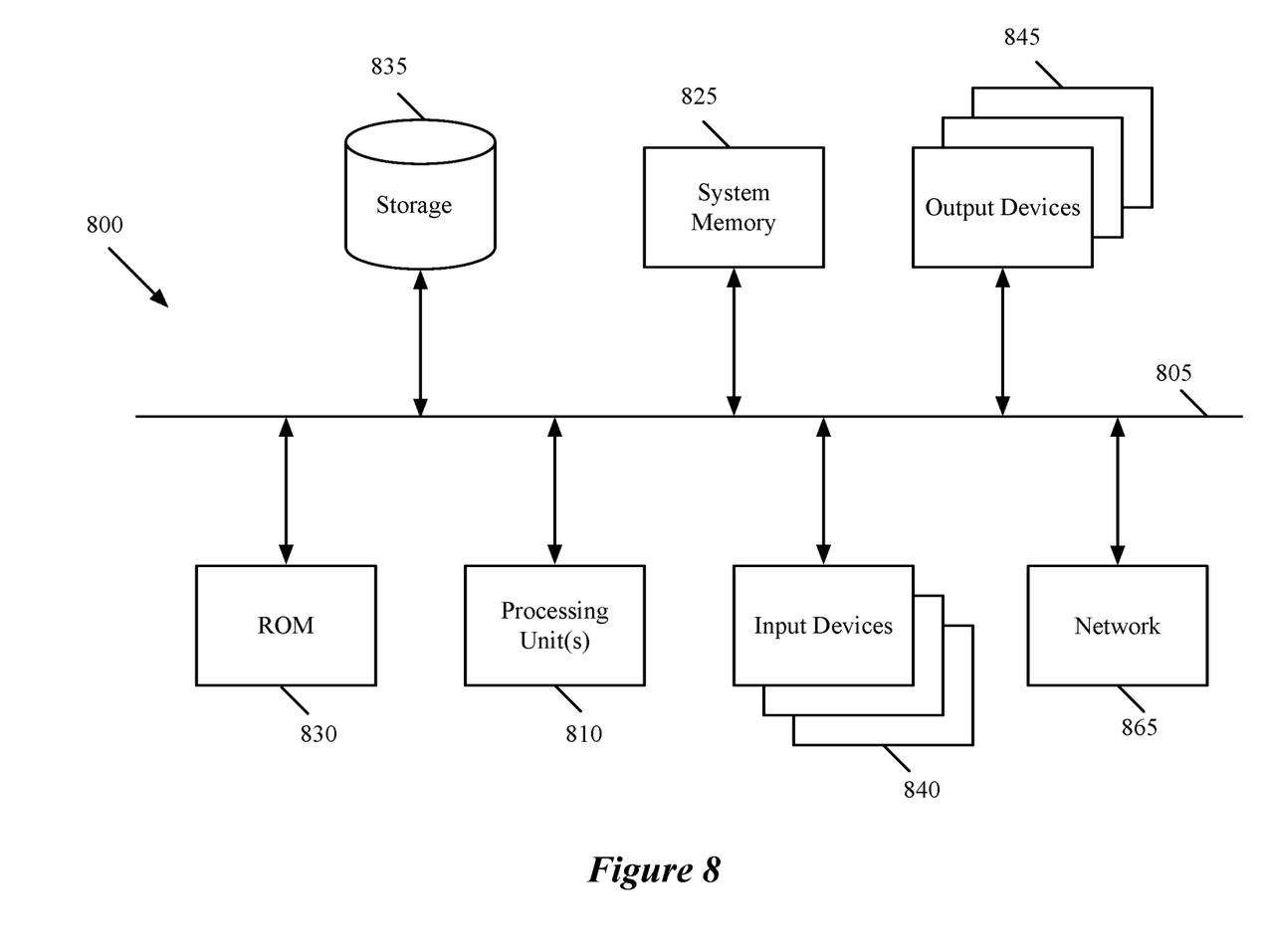
FIG. 8 conceptually illustrates a computer system with which some embodiments of the invention are implemented.

FIG. 8 conceptually illustrates a computer system 800 with which some embodiments of the invention are implemented. The computer system 800 can be used to implement any of the above-described computers and servers. As such, it can be used to execute any of the above described processes. This computer system includes various types of non-transitory machine readable media and interfaces for various other types of machine readable media. Computer system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments. The read-only-memory (ROM) 830 stores static data and instructions that are needed by the processing unit(s) 810 and other modules of the computer system. The permanent storage device 835, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the computer system. The input devices 840 include alphanumeric keyboards and pointing devices (also called "cursor control devices"). The output devices 845 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples computer system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of deploying an externally routable Pod on a worker node in a first cluster deployed in a first virtual private cloud, the method comprising:
    at a control plane of a supervisor second cluster (SC):
        receiving, from a server, notification that an IP Pool custom resource instance has been created in response to an addition of the worker node to the first cluster;
        creating a set of one or more externally routable IP subnets for the IP pool; and
        providing, to the server, the set of externally routable IP subnets for the server to use to update IP Pool customer resource instance.

2. The method of claim 1 further comprising:
    providing a status update to a manager of the first cluster for the manager to direct a Kubernetes manager to update a routing record for the Pod on the worker node.

3. The method of claim 2, wherein the routing record is a CIDR (Classless Inter-Domain Routing) record.

4. The method of claim 2 further comprising before the notification is received:
    from the Kubernetes manager, receiving, at the first cluster manager, a notification that the worker node has been added; and
    from the first cluster manager, receiving, at the server, a request to create an IP Pool custom resource based on an IP Pool CRD (custom resource definition).

5. The method of claim 4 further comprising:
    from the first cluster manager, receiving, at the server, a request to create a RouteSet custom resource based on a RouteSet CRD;
    from the first cluster manager, receiving, at the SC control plane, a notification that a RouteSet CR has been added; and
    creating, at the SC control plane, one or more static routes to deploy at one or more intervening gateway routers between the Pod in the first cluster of the VPC and a network external to a first network for the first VPC.

6. The method of claim 5, wherein the external network is the network of the supervisor cluster.

7. The method of claim 5, wherein the external network is the network of a second VPC that connects to the first VPC and the SC through one or more gateway routers.

8. The method of claim 7, wherein each VPC has a set of managers to manage compute and network resources in each VPC, and the SC has a set of managers to manage compute and network resources in the SC as well as configure the gateway routers to allow traffic to reach said Pod from outside of the first network of the first VPC.

9. The method of claim 5 further comprising:
    specifying a middlebox service rule to perform a middlebox service operation on packets sent to the externally routable Pod from outside of the Pod's network; and
    distributing the middlebox service rule to a service node associated with an intervening gateway, said service node enforcing the service rule on said packets.

10. The method of claim 5 further comprising:
    specifying a middlebox service rule to perform a middlebox service operation on packets sent by the externally routable Pod to a machine outside of the Pod's network; and
    distributing the middlebox service rule to a service node associated with an intervening gateway, said service node enforcing the service rule on said packets.

11. A non-transitory machine readable medium storing a program for execution by a set of processing units, the program for deploying an externally routable Pod on a worker node in a first cluster deployed in a first virtual private cloud, the program comprising sets of instructions for:
    at a control plane of a supervisor second cluster (SC):
        receiving, from a server, notification that an IP Pool custom resource instance has been created in response to an addition of the worker node to the first cluster;
        creating a set of one or more externally routable IP subnets for the IP pool; and
        providing, to the server, the set of externally routable IP subnets for the server to use to update IP Pool customer resource instance.

12. The non-transitory machine readable medium of claim 11, the program further comprising a set of instructions for:
    providing a status update to a manager of the first cluster for the manager to direct a Kubernetes manager to update a routing record for the Pod on the worker node.

13. The non-transitory machine readable medium of claim 12, wherein the routing record is a CIDR (Classless Inter-Domain Routing) record.

14. The non-transitory machine readable medium of claim 12, the program further comprising, before the notification is received, sets of instructions for:
    from the Kubernetes manager, receiving, at the first cluster manager, a notification that the worker node has been added; and
    from the first cluster manager, receiving, at the server, a request to create an IP Pool custom resource based on an IP Pool CRD (custom resource definition).

15. The non-transitory machine readable medium of claim 14, the program further comprising sets of instructions for:

from the first cluster manager, receiving, at the server, a request to create a RouteSet custom resource based on a RouteSet CRD;

from the first cluster manager, receiving, at the SC control plane, a notification that a RouteSet CR has been added; and creating, at the SC control plane, one or more static routes to deploy at one or more intervening gateway routers between the Pod in the first cluster of the VPC and a network external to a first network for the first VPC.

16. The non-transitory machine readable medium of claim 15, wherein the external network is the network of the supervisor cluster.

17. The non-transitory machine readable medium of claim 15, wherein the external network is the network of a second VPC that connects to the first VPC and the SC through one or more gateway routers.

18. The non-transitory machine readable medium of claim 7, wherein each VPC has a set of managers to manage compute and network resources in each VPC, and the SC has a set of managers to manage compute and network resources in the SC as well as configure the gateway routers to allow traffic to reach said Pod from outside of the first network of the first VPC.

19. The non-transitory machine readable medium of claim 15, the program further comprising sets of instructions for:
specifying a middlebox service rule to perform a middlebox service operation on packets sent to the externally routable Pod from outside of the Pod's network; and
distributing the middlebox service rule to a service node associated with an intervening gateway, said service node enforcing the service rule on said packets.

20. The non-transitory machine readable medium of claim 15, the program further comprising sets of instructions for:
specifying a middlebox service rule to perform a middlebox service operation on packets sent by the externally routable Pod to a machine outside of the Pod's network; and
distributing the middlebox service rule to a service node associated with an intervening gateway, said service node enforcing the service rule on said packets.

* * * * *